United States Patent
Doolittle et al.

(10) Patent No.: US 9,625,994 B2
(45) Date of Patent: Apr. 18, 2017

(54) MULTI-CAMERA DEPTH IMAGING

(71) Applicant: MICROSOFT TECHNOLOGY LICENSING, LLC, Redmond, WA (US)

(72) Inventors: Don Doolittle, Woodinville, WA (US); Sam Sarmast, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 560 days.

(21) Appl. No.: 13/632,776

(22) Filed: Oct. 1, 2012

(65) Prior Publication Data

US 2014/0094307 A1    Apr. 3, 2014

(51) Int. Cl.
G06F 3/01    (2006.01)
A63F 9/24    (2006.01)
G06K 9/00    (2006.01)

(52) U.S. Cl.
CPC ......... G06F 3/017 (2013.01); G06K 9/00201 (2013.01); G06K 9/00335 (2013.01)

(58) Field of Classification Search
CPC ............ G06K 9/00335; G06K 9/00201; A63F 2300/1087; A63F 2300/1093; A63F 2009/2435; G06F 3/017; G06F 3/01; H04N 13/0007; H04N 13/0011; H04N 13/0048; H04N 2013/0081; H04N 13/0217; H04N 13/0282; G06T 7/002; G06T 7/0022; G06T 7/0057
USPC .......................................... 463/36; 345/156
See application file for complete search history.

(56) References Cited

U.S. PATENT DOCUMENTS

| 4,402,608 | A | 9/1983 | DiMatteo et al. |
| 6,903,735 | B2 | 6/2005 | Jeong et al. |
| 7,079,173 | B2 | 7/2006 | Jouppi |
| 7,473,884 | B2 * | 1/2009 | Fouquet et al. .............. 250/221 |
| 2004/0145722 | A1 * | 7/2004 | Uomori et al. .............. 356/4.01 |
| 2008/0297587 | A1 | 12/2008 | Kurtz et al. |
| 2010/0309292 | A1 | 12/2010 | Ho et al. |

(Continued)

FOREIGN PATENT DOCUMENTS

WO    WO 02/07839 A2 *    1/2002    ............. A63F 13/00

OTHER PUBLICATIONS

Wilson, et al., "Combining Multiple Depth Cameras and Projectors for Interactions On, Above and Between Surfaces", Retrieved at <<http://research.microsoft.com/en-us/um/people/awilson/publications/WilsonUIST2010/Wilson%20UIST%202010%20LightSpace.pdf>>, In Proceedings of the 23nd Annual Acm Symposium on User Interface Software and Technology, Oct. 3, 2010, pp. 10.

(Continued)

*Primary Examiner* — David L Lewis
*Assistant Examiner* — Matthew D. Hoel
(74) *Attorney, Agent, or Firm* — Alleman Hall McCoy Russell & Tuttle LLP

(57) ABSTRACT

Embodiments related to acquiring depth images via a plurality of depth cameras are disclosed. For example, in one disclosed embodiment, a first portion of depth data is received from a first depth camera, and a second portion of depth data is received from a second depth camera. A gesture of a human subject sighted by the first and second depth cameras is detected in real time, based on combined data computed from the first and second portions of depth data. Input data indicative of the gesture is then provided to a computer system.

18 Claims, 7 Drawing Sheets

(56) References Cited

U.S. PATENT DOCUMENTS

2012/0194650 A1* 8/2012 Izadi .................. H04N 13/0271
 348/47
2013/0229485 A1* 9/2013 Rusanovskyy .... H04N 13/0048
 348/43

OTHER PUBLICATIONS

Kim, et al., "Generation of ROI Enhanced Depth Maps Using Stereoscopic Cameras and a Depth Camera", Retrieved at <<http://ieeexplore.ieee.org/stamp/stamp.jsp?tp=&arnumber=4675816>>, IEEE Transactions on Broadcasting, vol. 54, No. 4, Dec. 2008, pp. 9.

Woetzel, et al., "Real-Time Multi-Stereo Depth Estimation on GPU with Approximative Discontinuity Handling", Retrieved at <<http://ieeexplore.ieee.org/stamp/stamp.jsp?tp=&arnumber=1374688>>, 1st European Conference of Visual Media Production, Mar. 15, 2004, pp. 10.

Benko, et al., "Multi-Point Interactions with Immersive Omnidirectional Visualizations in a Dome", Retrieved at <<http://research.microsoft.com/en-us/um/people/awilson/publications/benkoits2010/benkoits2010.pdf>>, In Proceeding of International Conference on Interactive Tabletops and Surfaces, Nov. 7, 2010, pp. 10.

Chen, et al.,"Motion Sensing Technology", Retrieved at <<http://www.pickar.caltech.edu/e103/Final%20Exams/Motion%20Sensing%20Technology.pdf>>, Jun. 2, 2011, pp. 28.

Bramberger, Michael et al., "Distributed Embedded Smart Cameras for Surveillance Applications", IEEE Computer Society, vol. 39, Issue 2, Feb. 2006, pp. 68-75.

Buttgen, Bernhard et al., "Robust Optical Time-of-Flight Range Imaging Based on Smart Pixel Structures", IEEE Transactions on Circuits and Systems I: Regular Papers, vol. 55, Issue 6, Jul. 2008, pp. 1512-1525.

Lottner, O. et al., "Time-of-Flight Cameras with Multiple Distributed Illumination Units", Proceedings of the 8th WSEAS International Conference on Signal Processing, Computational Geometry and Artificial Vision, Aug. 2008, pp. 40-45.

Mancas, Matei et al., "Toward a Social Attentive Machine", AAAI Fall Symposium: Robot-Human Teamwork in Dynamic Adverse Environment, Nov. 4, 2011, 6 Pages.

Schroder, Yannic et al., "Multiple Kinect Studies", Technical Report 2011-09-15, ICG, Oct. 5, 2011, 30 Pages.

ISA European Patent Office, International Search Report and Written Opinion for Patent Application No. PCT/US2013/060218, Mar. 17, 2014, 9 Pages.

"Be Your Own Souvenir", https://vimeo.com/21676294, blablabLAB, Available online on Mar. 29, 2011, 2 pages.

\* cited by examiner

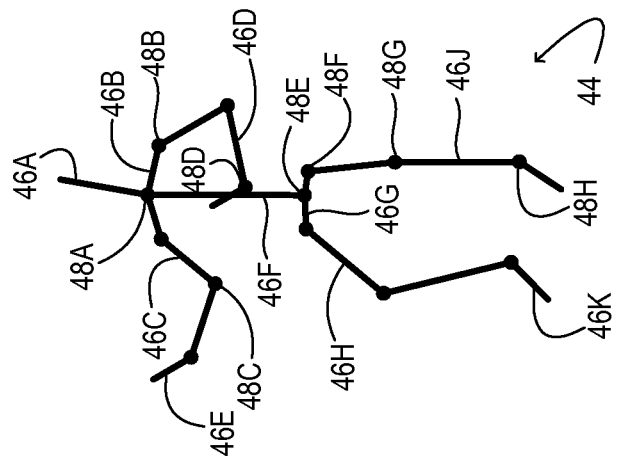
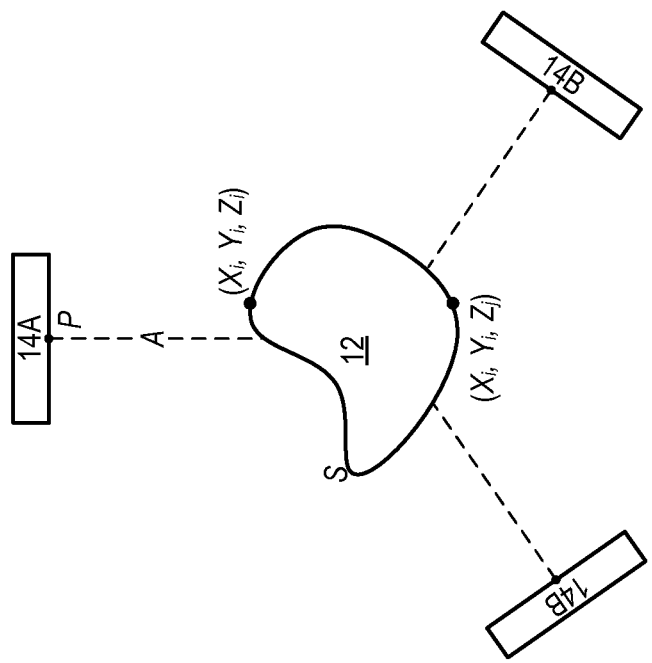
FIG. 6
FIG. 5

MULTI-CAMERA DEPTH IMAGING

A computer may be configured to accept various forms of user input. In addition to conventional user input—keystrokes, joystick movements, and mouse clicks—some computers may accept so-called 'natural user input'. Examples of natural user input include voice, touch, and various hand and body gestures not involving touch. A video camera may be used to acquire gesture-based user input. While two-dimensional color video may be used in some applications, depth video may allow a hand or body gesture to be resolved even when that gesture includes motion parallel to the optical axis of the video camera, and therefore may provide advantages over two-dimensional video.

Gesture recognition based on depth video has been applied to video gaming. In one approach, a depth camera is arranged to sight one or more game players. The players enact gestures with their hands and bodies, which are captured by the depth camera and transmitted to a game console. Video-processing componentry in the console identifies the gestures and provides corresponding low-level input to control the game. This approach can also be used in non-gaming computer applications.

SUMMARY

Various embodiments are disclosed herein that relate to the use of a plurality of depth cameras to obtain depth information of a scene. For example, one embodiment of this disclosure provides a method, enacted in processing and data-storage hardware, for controlling a computer system. In this embodiment, a first portion of depth data is received from a first depth camera, and a second portion of depth data is received from a second depth camera. A gesture of a human subject sighted by the first and second depth cameras is detected in real time, based on combined data computed from the first and second portions of depth data. Input data indicative of the gesture is then provided to the computer system.

This Summary is provided to introduce, in simplified form, a selection of concepts that are further described in the Detailed Description. This Summary is not intended to identify key features or essential features of the claimed subject matter, nor is it intended to be used to limit the scope of the claimed subject matter. Furthermore, the claimed subject matter is not limited to implementations that solve any disadvantages noted in any part of this disclosure.

BRIEF DESCRIPTION OF THE DRAWINGS

FIG. 5 shows a configuration of depth cameras to compute a multi-axis depth map in accordance with an embodiment of this disclosure.

FIG. 6 shows aspects of an example virtual skeleton in accordance with an embodiment of this disclosure.

DETAILED DESCRIPTION

Figure 1:
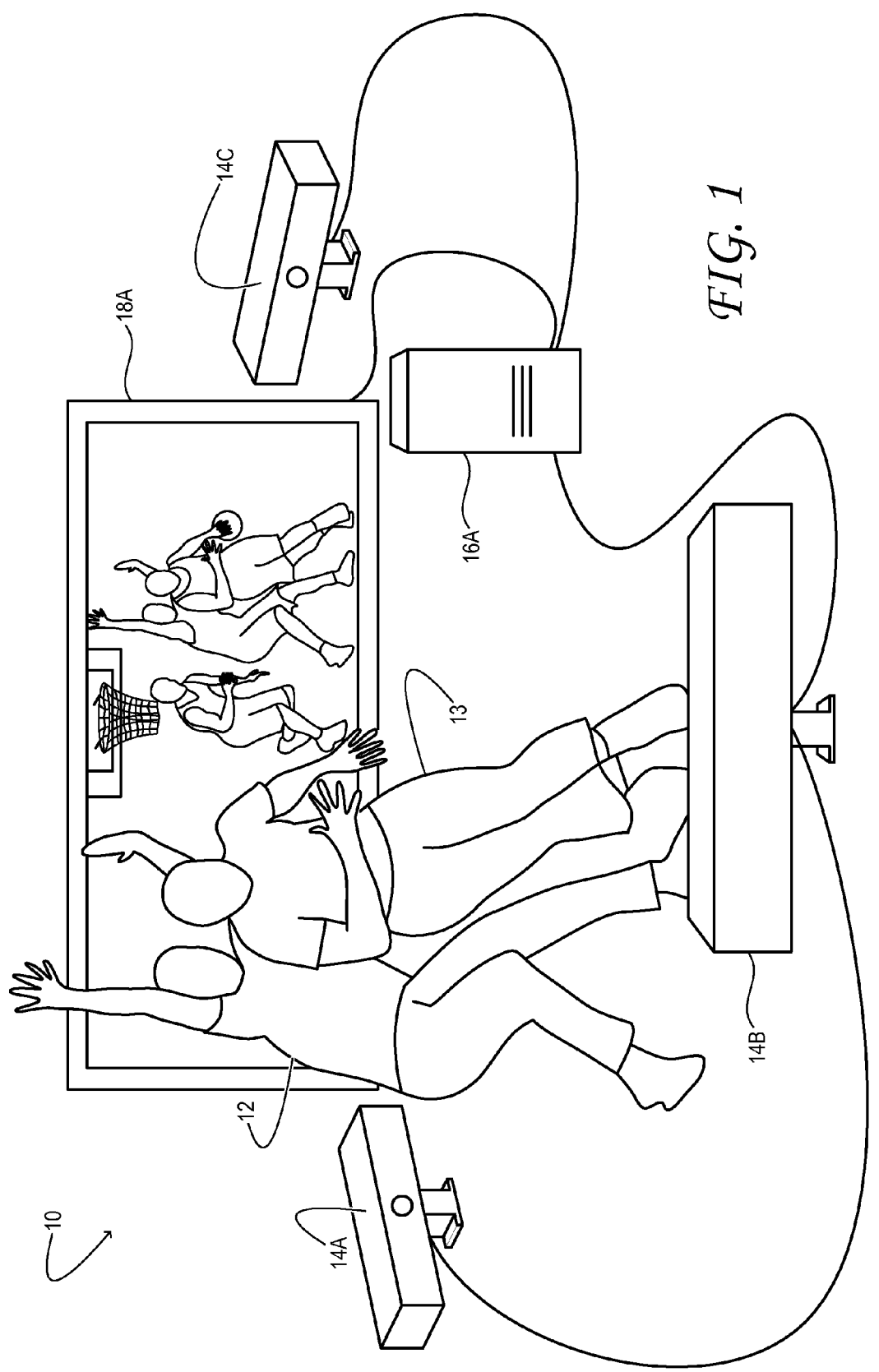
FIG. 1 shows aspects of an example video-gaming environment in accordance with an embodiment of this disclosure.

FIG. 1 shows aspects of an example embodiment of a video-gaming environment 10 in which players 12 and 13 are playing a virtualized basketball game. In environment 10, there is no physical net or ball; the players merely act out the gestures of the game—e.g., dribbling, passing and/or shooting the ball, advancing across the court, throwing blocks, etc. Such gestures are captured by depth camera 14A, which is arranged to sight the players and configured to generate a video feed. The video feed is provided as input to computer system 16A—a video game console or suitably adapted personal computer, for example. The computer system is configured to mine the video feed for recognizable hand or body gestures of players 12 and 13, which it uses to control the basketball game. For instance, if the computer system determines that player 12 has raised both of his arms, it may generate a low-level input to the video game application to the effect that 'player 12 has both arms up', or 'player 12 is in blocking position', etc.

The video game application may be executed, at least in part, on computer system 16A. There, virtualized forms of players 12 and 13 may be instantiated in suitable data structures, along with other virtual players not physically present in environment 10. Such players may include so-called 'cpu players' or actual players from remote environments. To this end, computer system 16A may be networked with other computer systems to enable players from different environments to play the same game in real time. In the embodiment of FIG. 1, the evolving data structures that represent the virtualized players and other elements of the basketball game—e.g., the ball, net, court, etc.—are displayed on large-format display 18A, which is arranged in view of the players.

In one, non-limiting embodiment, computer system 16A may be an XBOX 360 entertainment console, available from Microsoft Corporation of Redmond, Wash., and depth camera 14A may be a KINECT depth camera system, also from Microsoft Corporation. More generally, the depth camera may comprise any imaging system configured to acquire a time-resolved sequence of depth maps of one or more subjects that it sights—e.g., one or more human subjects, such as players 12 and 13. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, the depth camera may be configured to acquire two-dimensional image data from which a depth map is obtained via downstream processing.

In general, the nature of depth camera 14A may differ in the various embodiments of this disclosure. In one embodiment, brightness or color data from two, stereoscopically oriented imaging arrays in the depth camera may be co-registered and combined to yield a depth map. In other embodiments, the depth camera may be configured to project on the subject a structured infrared (IR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, depth camera 14A may project a pulsed infrared illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the source to the subject and then to the arrays, is discernible based on the relative amounts of light received in corresponding elements of the two arrays. It will be understood that these examples of depth imaging methods are presented for the purpose of illustration, and are not intended to be limiting in any manner.

Figure 2:
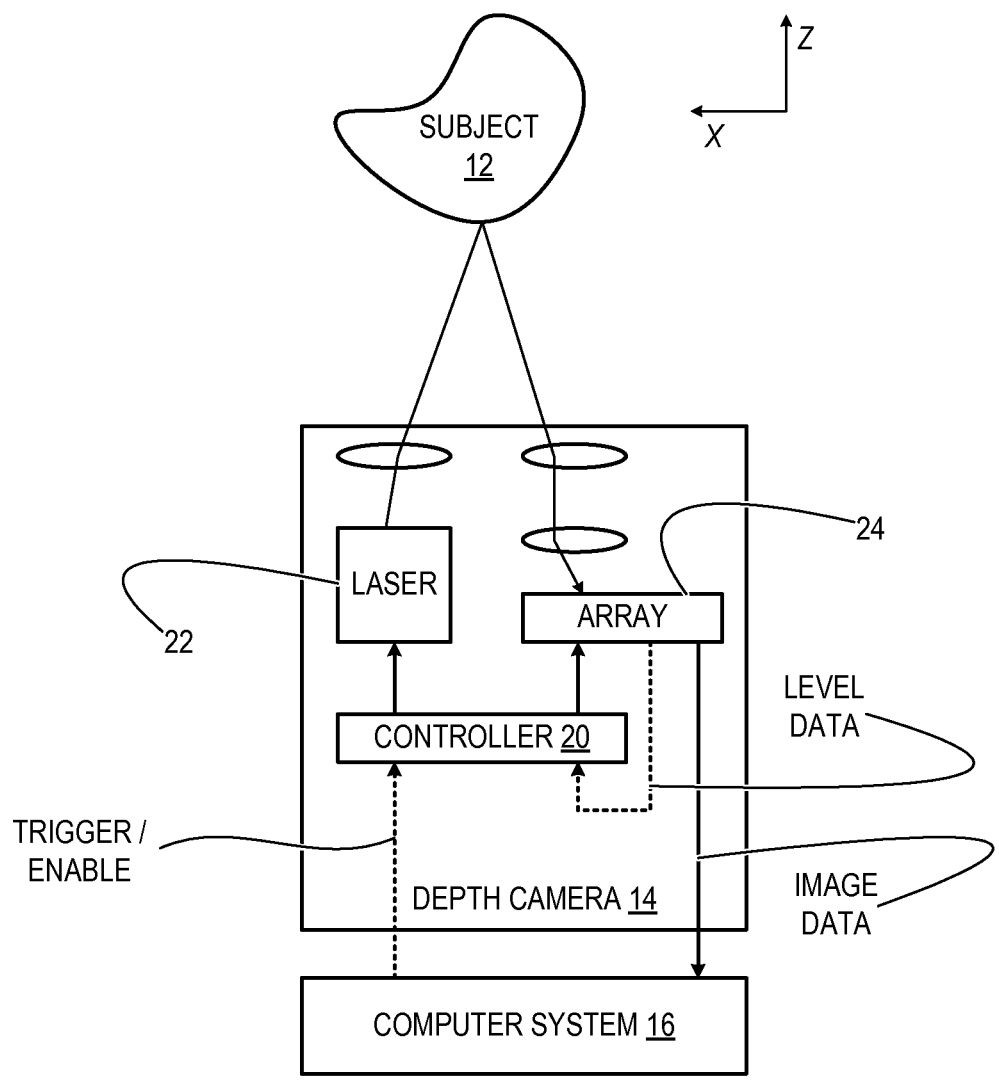
FIG. 2 schematically shows aspects of an example depth camera in accordance with an embodiment of this disclosure.

FIG. 2 schematically shows aspects of an example depth camera 14A. Camera 14A may generically represent the structured-illumination and time-of-flight embodiments described above. The illustrated depth camera includes a controller 20 configured to triggers or enables laser 22 to emit illumination light (e.g. pulse or structured light pattern). Imaging array 24 receives a portion of the light reflected back from subject 12, forming image data, which is transmitted to computer system 16A. In some embodiments, the computer system may trigger the depth camera controller to enable emission of the illumination light. In other embodiments, the controller may receive light level data from the imaging array, and based on the light level data, determine when to enable emission of the pulse. These variants are described hereinafter in greater detail.

Returning now to FIG. 1, a single depth camera 14A may be sufficient, under some conditions, to continuously sight players 12 and 13 so that their gestures can be detected. Other scenarios are envisaged, however, in which no single depth camera can continuously sight a given player during game activity, or resolve that player's gestures accurately enough to provide input to the video game application. In FIG. 1, for example, player 12 is blocking player 13 from depth camera 14A. In this scenario, depth camera 14A may be unable to resolve hand or body gestures from player 13. In other scenarios, a single depth camera could lose sight of a player if that player moves behind an obstacle, such as furniture.

In view of the above issues, environment 10 includes additional depth cameras 14B and 14C. In some embodiments, the additional depth cameras may be substantially the same as depth camera 14A, while in other embodiments the additional depth cameras may be different. The number and relative positions of the depth cameras and players in FIG. 1 should not be understood in a limiting sense, for numerous other configurations are contemplated as well. In some configurations, for example, at least one depth camera may be arranged above the one or more subjects sighted. In other embodiments, any number of depth cameras may be arranged beside the subjects, at substantially the same level. With a plurality of depth cameras arranged around the environment, each subject may remain in sight of at least one depth camera at all times.

In order to take advantage of this approach, output from each of the depth cameras may be combined to extract an appropriate sequence of inputs for computer system 16A, based on the gestures of the one or more subjects. Moreover, certain measures may be taken to ensure that two or more depth cameras in sight of each other do not prevent each other from operating correctly. For instance, depending upon how the multiple depth cameras are configured, it may be undesirable for a depth camera to mistake illumination from another depth camera for its own illumination. To that end, each depth camera may, in one example, emit illumination of a relatively narrow wavelength band that overlaps minimally with that of the other depth cameras. The imaging array of each depth camera may receive reflected light through a filter matched to the narrow band, to reduce interference from the other depth cameras. Other suitable approaches are described hereinafter.

No aspect of this description should be understood in a limiting sense, for numerous variations and extensions are contemplated as well. For example, although environment 10 is described as a video-gaming environment, it is more generally an environment for providing input to a computer system. Accordingly, the approaches set forth herein are fully adaptable to computer applications other than gaming. These may include any computer application in which a subject's hand or body gesture and/or posture is used to command a computer system to take one or more actions.

Figure 3:
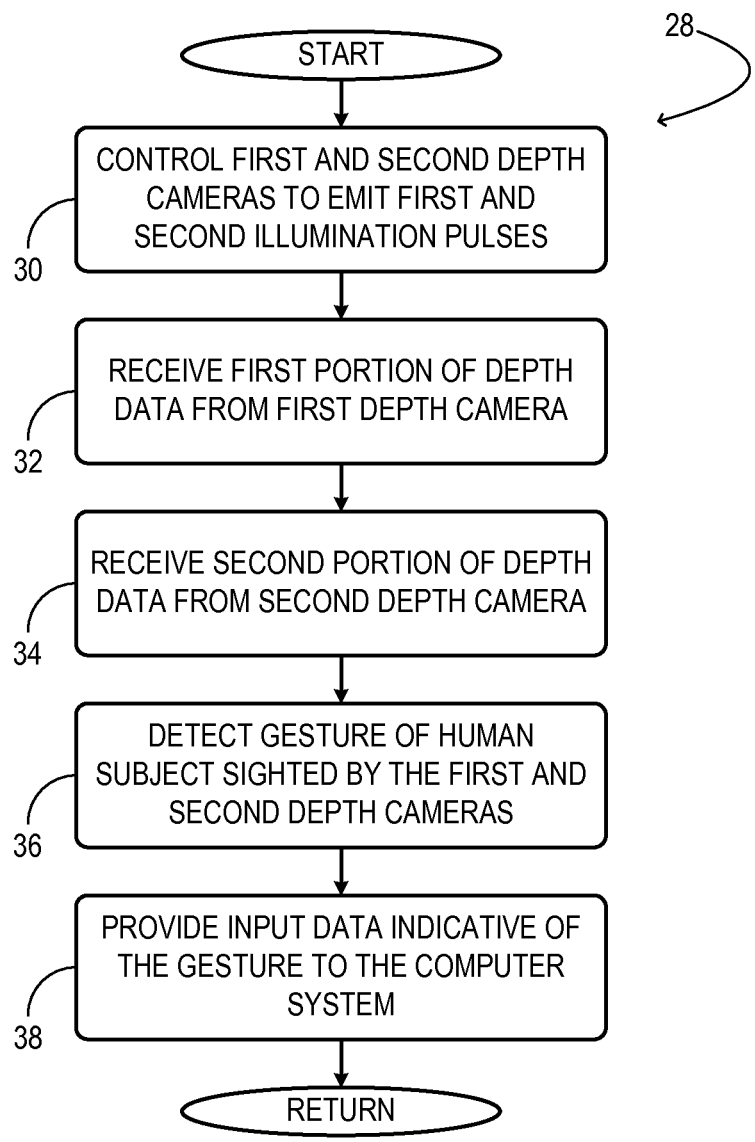
FIG. 3 illustrates an example method for controlling a computer system in accordance with an embodiment of this disclosure.

FIG. 3 illustrates an example method 28 for controlling a computer system, such as computer system 16A. The method may be enacted in processing and data-storage hardware of the computer system being controlled or of another computer system. For ease of description, the computer system or portion that does the controlling may be referred to as a 'first' computer system, and the computer system or portion being controlled may be referred to as a 'second' computer system.

At 30 of method 28, first and second depth cameras are controlled to emit corresponding, non-concurrent, first and second illumination pulses. The illumination pulses may be alternating pulses if only two depth cameras are included in the configuration. In other words, a first depth camera may toggle between an emitting and a non-emitting state (for example, at a fifty-percent duty cycle), with the second depth camera emitting only when the first depth camera is not emitting. In this manner, the first depth camera may be triggered to emit a first illumination pulse during a first time slice, and the second depth camera may be triggered to emit a second illumination pulse during a second, non-concurrent time slice. If more than two depth cameras are included, illumination pulses may be emitted from each depth camera in sequence, with one depth camera emitting at any given time.

In one embodiment, the illumination pulse sequence of the various depth cameras may be directed by logic external to any of the depth cameras. For example, computer system 16A, in FIG. 1, may know how many depth cameras are connected and may establish, for those cameras, a suitable sequence of non-overlapping illumination pulses. In other embodiments, the illumination pulse sequence may be determined by logic internal to the depth cameras. For example, a first depth camera may be configured to emit a first illumination pulse, and a second depth camera may be configured to sense whether the first depth camera is emitting the first illumination pulse. The second depth camera may do so by sensing an overall light level in the IR band in which the first and second cameras both emit, for example. The second depth camera may be configured to emit a second illumination pulse only when the first depth camera is not emitting the first illumination pulse. Any number of depth cameras may be used together in this manner.

In still other examples, the various depth cameras may be configured to communicate with each other, for example, via wireless or wired network, and thereby negotiate a schedule of illumination pulses in which no illumination pulse from first depth camera overlaps an illumination pulse from the second depth camera. The depth cameras may communicate in any suitable manner. Examples include, but are not limited to, wireless protocols such as Bluetooth, Wi-Fi, Wi-Fi Direct, and the like. In still other examples, the communication signal may be encoded in the infrared illumination emitted by the depth cameras. For instance, a unique serial number (e.g., 1, 2, 3, etc.) may be assigned to each of the depth cameras upon initial connection to the computer system, or on boot-up. Then, the unit assigned the number 1 will transmit an illumination pulse. When this unit is finished transmitting its illumination pulse, it then transmits a predefined delimiter sequence (e.g., one or more other pulses from the same light source, recognizable by the other units) to indicate that the illumination pulse is complete. The other units, which are not transmitting at this time, are configured to detect the illumination from unit 1 and monitor for the delimiter sequence. When unit 2 receives the delimiter sequence, it recognizes that it is time to transmit its own illumination pulse. After unit 2 transmits its illumination pulse, it will also transmit a delimiter sequence, triggering unit 3 to transmit, and so on. When the last unit transmits the delimiter sequence, unit 1 is triggered to transmit again.

Continuing with FIG. 3, at 32 of method 28, a first portion of depth data is received from a first depth camera. At 34 a second portion of depth data is received from a second depth camera. The first and second portions of depth data may, for example, image different sides of one or more human subjects sighted by the cameras—e.g., opposite sides or adjacent sides. Each of the first and second portions of depth data may be acquired by a corresponding depth camera during a time when that camera, but no other camera, is emitting illumination light. Either or both portions of depth data may include information from which certain hand and/or body gestures of a sighted human subject may be determined. In embodiments in which more than two depth cameras are used to sight a human subject, a corresponding portion of depth data may be received from each of the depth cameras. In one embodiment, the combined field of view from the plurality of depth cameras may enclose an expected locus of the human subject—e.g., a permitted area of a player in a video game. In one non-limiting embodiment, the combined field of view from the plurality of depth cameras may provide a 360°, wrap-around view of the subject or subjects.

At 36 a gesture of a human subject sighted by the first and second depth cameras is detected in real time, based on combined data computed from the corresponding first and second portions of depth data. In embodiments in which more than two depth cameras are included, the gesture may be detected based on combined data computed from corresponding portions of depth data from each camera. In some embodiments, the gesture detected may involve movement of some part of the subject's body. In one non-limiting embodiment, the gesture may correspond to an action of a player in a video game. In embodiments in which more than one human subject is sighted, a gesture for each subject sighted may be detected based on combined data computed from each portion of depth data.

Figure 7:
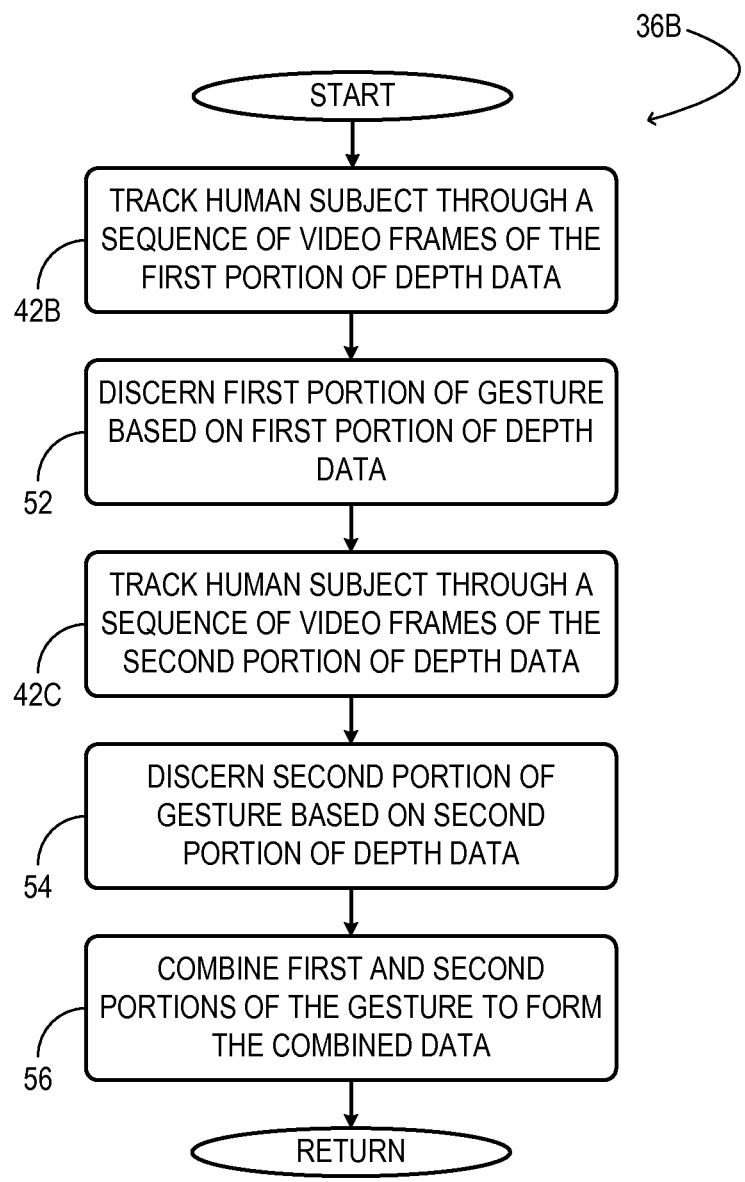
FIG. 7 illustrates another example method for detecting a gesture of a human subject based on combined data computed from separately received first and second portions of depth data in accordance with an embodiment of this disclosure.

Because the subject's gesture is detected based on combined data from a plurality of depth cameras, the gesture may be detected even where the subject, or any portion of the subject, is not sighted concurrently by the first and second depth cameras over a period of time. Accordingly, gesture detection may be performed even where the first and second portions of depth data individually do not include sufficient information for the gesture detection. More particular methods for detecting the gesture of a human subject are illustrated in FIGS. 4 and 7 and are described hereinafter.

Continuing with method 28, at 38 input data indicative of the detected gesture is provided to the computer system. Such input may take the form of an encoded signal carried wirelessly or through a wire, and may be represented digitally in any suitable data structure. From 38, the method returns.

Figure 4:
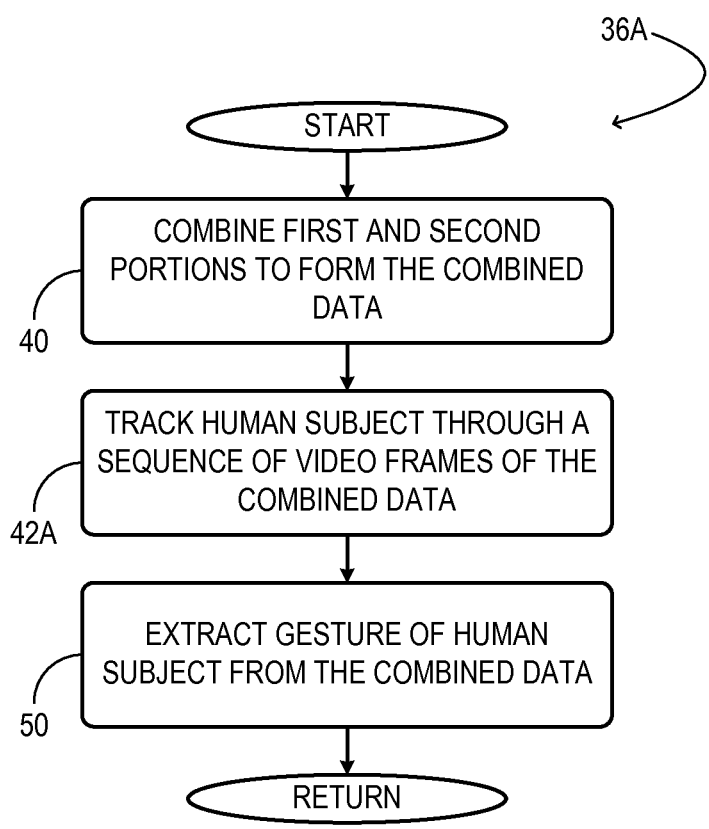
FIG. 4 illustrates an example method for detecting a gesture of a human subject based on combined data computed from separately received first and second portions of depth data in accordance with an embodiment of this disclosure.

FIG. 4 illustrates an example method 36A for detecting a gesture of a human subject based on combined data computed from separately received first and second portions of depth data. At 40 of method 36A, the first and second portions of depth data received from the depth cameras are combined to yield the combined data in the form of a multi-axis depth map. The portions may be combined in any suitable manner. For example, in some embodiments, this action may include mapping the fields of view of each of the depth cameras onto a common coordinate system. In preparation for such mapping, the system may be initialized by arranging a recognizable and sufficiently asymmetric reference (e.g., a stationary human subject) simultaneously in sight of all the depth cameras in use. The field-of-view orientations of the various depth cameras may then be adjusted, parametrically, to achieve consistency in the topology of the reference as perceived by each of the depth cameras. Once the field-of-view orientations are appropriately mapped, individual single-axis depth maps from each of the depth cameras may be combined to yield a multi-axis depth map. This action may entail a 'stitching' procedure analogous to the stitching together of multiple color images of a subject to form a panoramic image, with the addition of a third coordinate direction to reconcile with an adjacent depth map to yield the resulting multi-axis depth map.

As shown in FIG. 5, a single depth camera can image a limited portion of a surface S. That portion is sightable from a single point of view P, which lies at a terminus of the optical axis A of the camera. In a single-axis depth map, the sightable portion may be defined by a triplet set of Cartesian coordinates $(X_i, Y_i, Z_i)$, with one Z coordinate associated with a given (X, Y) pair. In contrast, multiple depth cameras can image an extended portion of a surface, sightable together only from multiple points of view—i.e., termini of the different optical axes of the cameras. In a multi-axis depth map, this extended portion may also be defined in terms of Cartesian triplets, but more than one Z coordinate may be associated with a given (X, Y) pair. In this manner, front and back portions of a surface may be represented in the same multi-axis depth map. As in the case of a single-axis depth map, a time-resolved sequence of multi-axis depth maps may be assembled in frames, as video.

Returning now to FIG. 4, at 42A the sighted human subject is tracked through the sequence of video frames assembled as described above. In one embodiment, such tracking may include skeletal tracking, where a virtual skeleton of the subject is obtained based on one or more of the depth maps received. FIG. 6 shows an example virtual skeleton 44 in one embodiment. The virtual skeleton includes a plurality of skeletal segments 46 pivotally coupled at a plurality of joints 48. In some embodiments, a body-part designation may be assigned to each skeletal segment and/or each joint. In FIG. 6, the body-part designation of each skeletal segment 46 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 48 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 6 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any or all of these parameters for each joint. In this manner, the metrical data defining the virtual skeleton—its size, shape, orientation, position, etc.—may be assigned to the joints.

The skeletal segments and/or joints of the virtual skeleton may be fit to the depth map at 42A of FIG. 4. This action may determine the appropriate positions, rotation angles, and other parameter values of the various joints of the skeleton. Via any suitable minimization approach, the lengths of the skeletal segments and the positions and rotational angles of the joints may be adjusted for agreement with the various contours of the depth map. In some embodiments, the act of fitting the skeletal segments may include assigning a body-part designation to a plurality of contours of the depth map. Optionally, the body-part designations may be assigned in advance of the minimization. As such, the fitting procedure may be informed by or based partly on the body-part designations. For example, a previously trained collection of body models may be used to label certain pixels from the depth map as belonging to a particular body part; a skeletal segment appropriate for that body part may then be fit to the labeled pixels. If a given contour is designated as the head of the subject, then the fitting procedure may seek to fit to that contour a skeletal segment pivotally coupled to a single joint—viz., the neck. If the contour is designated as a forearm, then the fitting procedure may seek to fit a skeletal segment coupled to two joints—one at each end of the segment. Furthermore, if it is determined that a given contour is unlikely to correspond to any body part of the subject, then that contour may be masked or otherwise eliminated from subsequent skeletal fitting. The foregoing description should not be construed to limit the range of approaches that may be used to construct a virtual skeleton, for a virtual skeleton may be derived from a depth map in any suitable manner without departing from the scope of this disclosure.

Continuing in FIG. 4, at 50 a gesture—e.g., a complete gesture—of a human subject is extracted from the multi-axis depth map. For example, the position and orientation of the right forearm of the subject, as specified in the model, may be extracted. In some embodiments, the gestural input may include the positions or orientations of all of the skeletal segments and/or joints of the model, thereby providing a complete survey of the subject's posture. In this manner, an application or operating system of the computer system may be furnished input based on the model. From 50, the method returns.

FIG. 7 illustrates another example method 36B for detecting a gesture of a human subject based on combined data computed from separately received first and second portions of depth data. At 42B of method 36B, the human subject is tracked through a sequence of video frames of the first portion of depth data and not the second portion of depth data. At 52 a first portion of a gesture of the human subject—in some cases an incomplete gesture—is detected based on the first portion of depth data. The gesture may be incomplete temporally or spatially. To understand the difference, suppose that the gesture in question is a layup by player 13 of FIG. 1. In one scenario, depth camera 14A may capture a temporally incomplete, earlier, first portion of the gesture—e.g., before player 12 assumes a blocking position in front of the depth camera. In an alternative scenario in which player 12 is already in the position before the lay up, depth camera 14A may capture a spatially incomplete first portion of the gesture—e.g., a portion limited to the right arm of player 13, which is not blocked by player 12.

Continuing in FIG. 7, at 42C the human subject is tracked through a sequence of video frames of the second portion of depth data. At 54 a second portion of the gesture of the human subject—in some cases a temporally or spatially complementary portion of the gesture—is detected based on the second portion of depth data. A temporally complementary second portion may include a later portion of the gesture that completes the earlier first portion of the gesture. A spatially complementary second portion may include a portion that resolves body parts that were not resolved in the first portion. At 56 the first and second portions of the gesture are combined to yield the combined data in the form of a completed gesture. This action may include recognizing a common feature of the human subject (e.g., a torso) in both the first and second portions of depth data. From 56, the method returns.

In the embodiments illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
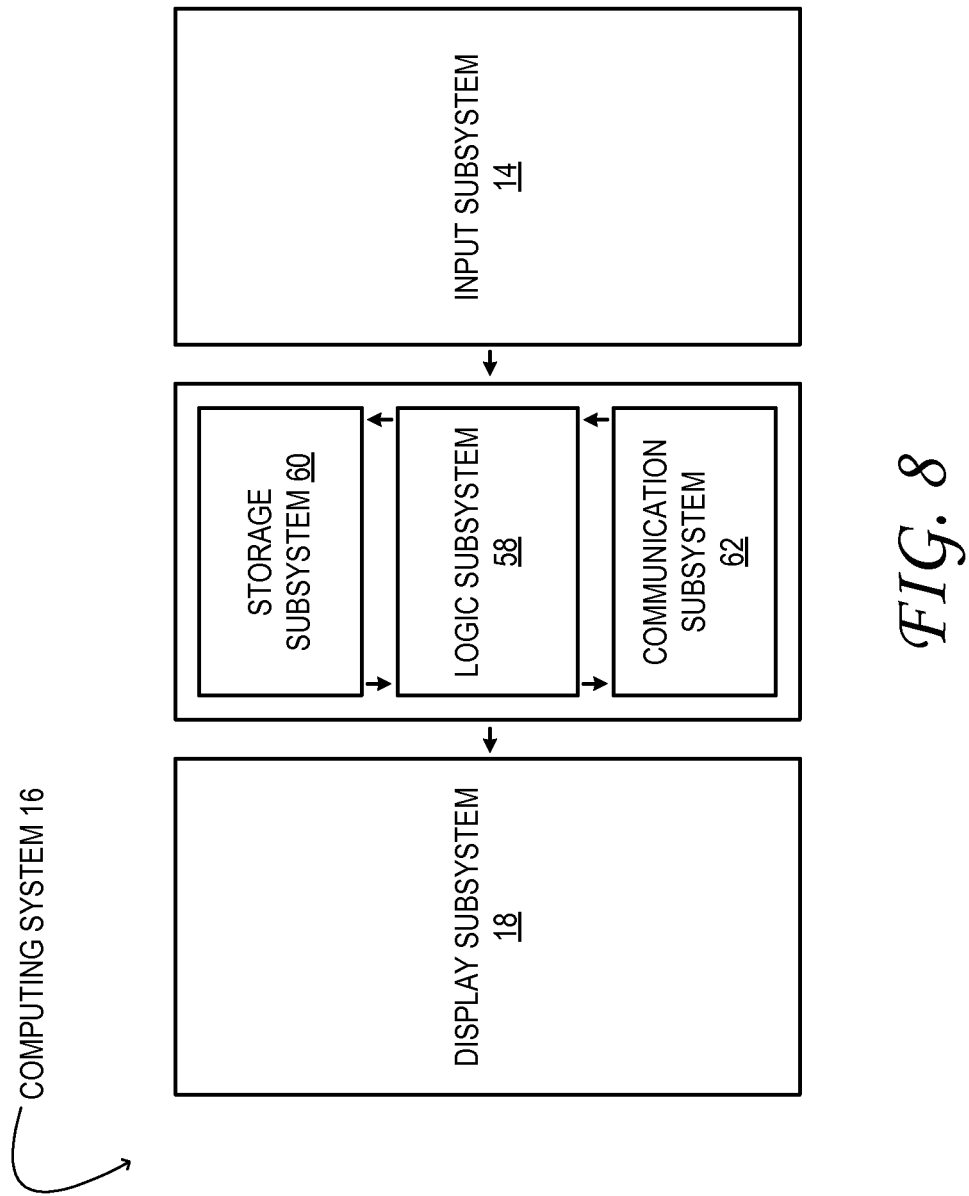
FIG. 8 shows aspects of an example computer system in accordance with an embodiment of this disclosure.

FIG. 8 schematically shows a non-limiting embodiment of a computing system 16 that can perform one or more of the methods and processes described above. Computing system 16 is shown in simplified form. It will be understood that virtually any computer architecture may be used without departing from the scope of this disclosure. In different embodiments, computing system 16 may take the form of a mainframe computer, server computer, desktop computer, laptop computer, tablet computer, home-entertainment computer, network computing device, gaming device, mobile computing device, mobile communication device (e.g., smart phone), etc.

Computing system 16 includes a logic subsystem 58 and a storage subsystem 60. Computing system 16 may optionally include a display subsystem 18, input subsystem 14, communication subsystem 62, and/or other components not shown in FIG. 8. Computing system 16 may also optionally include or interface with one or more user-input devices such as a keyboard, mouse, game controller, camera, microphone, and/or touch screen, for example. Such user-input devices may form part of input subsystem 14 or may interface with input subsystem 14.

Logic subsystem 58 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 60 includes one or more physical, non-transitory, devices configured to hold data and/or instructions executable by the logic subsystem to implement the herein-described methods and processes. When such methods and processes are implemented, the state of storage subsystem 60 may be transformed—e.g., to hold different data.

Storage subsystem 60 may include removable media and/or built-in devices. Storage subsystem 60 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 60 may include volatile, nonvolatile, dynamic, static, read/write, read-only, random-access, sequential-access, location-addressable, file-addressable, and/or content-addressable devices.

It will be appreciated that storage subsystem 60 includes one or more physical, non-transitory devices. However, in some embodiments, aspects of the instructions described herein may be propagated in a transitory fashion by a pure signal—e.g., an electromagnetic or optical signal, etc.—that is not held by a physical device for a finite duration. Furthermore, data and/or other forms of information pertaining to the present disclosure may be propagated by a pure signal.

In some embodiments, aspects of logic subsystem 58 and of storage subsystem 60 may be integrated together into one or more hardware-logic components through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The term "program" may be used to describe an aspect of computing system 16 implemented to perform a particular function. In some cases, a program may be instantiated via logic subsystem 58 executing instructions held by storage subsystem 60. It will be understood that different programs may be instantiated from the same service, code block, object, library, routine, API, function, etc. Likewise, the same program may be instantiated by different services, code blocks, objects, routines, APIs, functions, etc. The term "program" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

When included, display subsystem 18 may be used to present a visual representation of data held by storage subsystem 60. This visual representation may take the form of a graphical user interface (GUI). As the herein described methods and processes change the data held by the storage subsystem, and thus transform the state of the storage subsystem, the state of display subsystem 18 may likewise be transformed to visually represent changes in the underlying data. Display subsystem 18 may include one or more display devices utilizing virtually any type of technology. Such display devices may be combined with logic subsystem 58 and/or storage subsystem 60 in a shared enclosure, or such display devices may be peripheral display devices.

When included, communication subsystem 62 may be configured to communicatively couple computing system 16 with one or more other computing devices. Communication subsystem 62 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 16 to send and/or receive messages to and/or from other devices via a network such as the Internet.

Finally, it will be noted that the subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. In a computing device, a method for controlling a computer system, the method comprising:
   receiving a first single-axis depth map from a first depth camera, the first single-axis depth map providing a set of depth coordinates associated with a corresponding set of X, Y coordinates, the first depth camera comprising a first laser and a first image sensing array;
   receiving a second single-axis depth map from a second depth camera positioned to capture a different view of a scene from a view captured by the first depth camera, the second single-axis depth map providing a set of depth coordinates associated with a corresponding set of X, Y coordinates, the second depth camera comprising a second laser and a second image sensing array;
   stitching the first single-axis depth map to the second single-axis depth map to yield a multi-axis depth map;
   detecting, in real time, a gesture of a human subject in the multi-axis depth map; and
   providing input data indicative of the gesture to the computer system.

2. The method of claim 1, wherein the human subject is not continuously sighted by the first and second depth cameras concurrently, over a period of time.

3. The method of claim 1, wherein each of the first and second single-axis depth maps are arranged in respective first and second video-frame sequences, the method further comprising tracking the human subject through the first and second video-frame sequences.

4. The method of claim 3, wherein the tracking of the human subject includes skeletal tracking.

5. The method of claim 1, wherein the human subject is one of a plurality of human subjects sighted by the first and second depth cameras, and wherein for each human subject sighted, a gesture of that subject is detected based on the multi-axis depth map.

6. The method of claim 1, wherein the first and second depth cameras are among a plurality of depth cameras that sight the human subject, wherein a single-axis depth map is received from each of the depth cameras, and wherein the gesture of the human subject is detected based on a multi-axis depth map computed from each of the single-axis depth maps.

7. The method of claim 6, wherein at least one depth camera is arranged above the human subject.

8. The method of claim 1 further comprising controlling the first and second depth cameras to emit corresponding, non-concurrent first and second illumination pulses.

9. The method of claim 1, wherein detecting the gesture of the human subject includes:
detecting a first portion of the gesture based on the first single-axis depth map;
detecting a second portion of the gesture based on the second single-axis depth map; and
combining the first and second portions of the gesture to yield the combined data.

10. The method of claim 9, wherein combining the first and second portions of the gesture includes recognizing a common feature of the human subject in the first and second single-axis depth maps.

11. In a computing system operatively coupled to a video game system, a method for controlling the video game system, the method comprising:
receiving a first single-axis depth map from a first depth camera, the first single-axis depth map providing a set of depth coordinates associated with a corresponding set of X, Y coordinates, the first depth camera comprising a first laser and a first image sensing array;
receiving a second single-axis depth map from a second depth camera positioned to capture a different view of a scene from a view captured by the first depth camera, the second single-axis depth map providing a set of depth coordinates associated with a corresponding set of X, Y coordinates, the second depth camera comprising a second laser and a second image sensing array;
stitching the first single-axis depth map to the second single-axis depth map to yield a multi-axis depth map;
extracting from the multi-axis depth map, a gesture of a player of the video game system, the player sighted by the first and second depth cameras, the gesture corresponding to an action of the player in a game being played on the video game system; and
providing input data indicative of the gesture to the video game system.

12. The method of claim 11, wherein the first and second depth cameras are among a plurality of depth cameras that sight the player, wherein a single-axis depth map is received from each of the depth cameras, and wherein the gesture of the player is detected based on the multi-axis depth map computed from each of the single-axis depth maps.

13. A first computer system for controlling a second computer system, the first computer system comprising:
first and second depth cameras camera positioned to capture different views of a scene, the first depth camera comprising a first laser and a first image sensing array, and the second depth camera comprising a second laser and a second image sensing array; and
processing and data-storage hardware configured to receive a first single-axis depth map from the first depth camera, to receive a second single-axis depth map from the second depth camera, to stitch the first single-axis depth map to the second single-axis depth map to yield a multi-axis depth map, to detect in real time a gesture of the human subject sighted by the first and second depth cameras, and to provide input data indicative of the gesture to the second computer system,
wherein the first and second single-axis depth maps each provide a set of depth coordinates associated with a corresponding set of X, Y coordinates.

14. The first computer system of claim 13, wherein the first and second depth cameras are arranged beside the human subject at substantially the same level.

15. The first computer system of claim 13, wherein the first depth camera emits illumination of a first wavelength band, and the second depth camera emits illumination of a second wavelength band, different than the first wavelength band.

16. The first computer system of claim 13, wherein the first depth camera is configured to emit a first illumination pulse, and wherein the second depth camera is configured to sense whether the first depth camera is emitting the first illumination pulse, and to emit a second illumination pulse and acquire the second portion of depth data when the first depth camera is not emitting the first illumination pulse.

17. The first computer system of claim 13, wherein the first and second depth cameras are configured to communicate with each other, via transmission and receipt of a signal, and thereby negotiate a schedule of illumination pulses in which no illumination pulse from the first depth camera overlaps an illumination pulse from the second depth camera.

18. The first computer system of claim 17, wherein the signal is encoded in the illumination emitted by the first and second depth cameras.

* * * * *